(12) United States Patent
Zaghib et al.

(10) Patent No.: US 7,588,826 B2
(45) Date of Patent: Sep. 15, 2009

(54) PARTICLE CONTAINING A GRAPHITE BASED NUCLEUS WITH AT LEAST ONE CONTINUOUS OR DISCONTINUOUS LAYER, PROCESSES FOR PREPARING THE SAME AND THEIR USES

(75) Inventors: Karim Zaghib, Longueuil (CA); Patrick Charest, Sainte-Julie (CA); Abdelbast Guerfi, Brossard (CA); Michel Perrier, Montréal (CA); Kimio Kinoshita, Cupertino, CA (US)

(73) Assignee: Hydro-Quebec, Montreal, Quebec (CA)

( * ) Notice: Subject to any disclaimer, the term of this patent is extended or adjusted under 35 U.S.C. 154(b) by 549 days.

(21) Appl. No.: 10/532,793

(22) PCT Filed: Oct. 23, 2003

(86) PCT No.: PCT/CA03/01619

§ 371 (c)(1),
(2), (4) Date: Jan. 9, 2006

(87) PCT Pub. No.: WO2004/038834

PCT Pub. Date: May 6, 2004

(65) Prior Publication Data

US 2006/0147790 A1    Jul. 6, 2006

(30) Foreign Application Priority Data

Oct. 23, 2002  (CA) .................................. 2409524

(51) Int. Cl.
*B32B 5/66*  (2006.01)
(52) U.S. Cl. .................... 428/403; 428/404; 428/405; 428/406; 428/407; 427/212; 427/215; 252/502; 252/506; 252/510
(58) Field of Classification Search ......... 428/403–407; 427/212, 215; 252/502, 506, 510
See application file for complete search history.

(56) References Cited

U.S. PATENT DOCUMENTS 5,521,026 A    5/1996  Brochu et al.

7,427,369 B2 *  9/2008  Guerfi et al. ................. 252/510
2001/0041293 A1   11/2001  Barsukov et al.

FOREIGN PATENT DOCUMENTS

| EP | 1 081 777 A2 | 3/2001 |
|---|---|---|
| EP | 1081777 A * | 3/2001 |
| JP | 51-80317 A | 7/1976 |
| JP | 53 149194 | 12/1978 |
| JP | 02051121 A | 2/1990 |
| JP | 2003-272630 | 9/2003 |
| WO | WO 03/063287 A2 | 7/2003 |

OTHER PUBLICATIONS

XP-002315532, Database WPI, Derwent Publications Ltd., London, GB; AN 1982-13450E.
XP-002315533, Database WPI, Derwent Publications Ltd., London, GB, AN 1976-65620X (corresponds to Japan 51 080317—see above).
Qingshan Zhu et al., Oxidation Resistant SiC Coating for Graphite Materials, Carbon, vol. 37, No. 9, 1999, pp. 1475-1484.
H.M. Gajiwala et al., Hybridized Resin Matrix Approach Applied for Development of Carbon/Carbon Composites—I, Carbon, Elsevier Science Publishing, New York, NY, vol. 36, No. 7-8, 1998, pp. 903-912.
Dr. J. Stein et al., Mechanofusion for High Performance Particles, CFI BER. DKG, Process Engineering, vol. 79, No. 4, Jan. 2002, pp. E11-E15.

* cited by examiner

*Primary Examiner*—Leszek Kiliman
(74) *Attorney, Agent, or Firm*—Buchanan Ingersoll & Rooney PC

(57) ABSTRACT

Process for preparing by crushing, a homogenous mixture of particles containing a conductive nucleus including at least one graphite and continuously or discontinuously coated with at least one material that is different from the one constituting the nucleus, the size of the particles of the nucleus being larger than the particles used for coating the nuclei by crushing the particles together. The mixtures of particles obtained show electrochemical and mechanical properties that enable them to be advantageously used in electrochemical batteries and in paints.

46 Claims, 7 Drawing Sheets

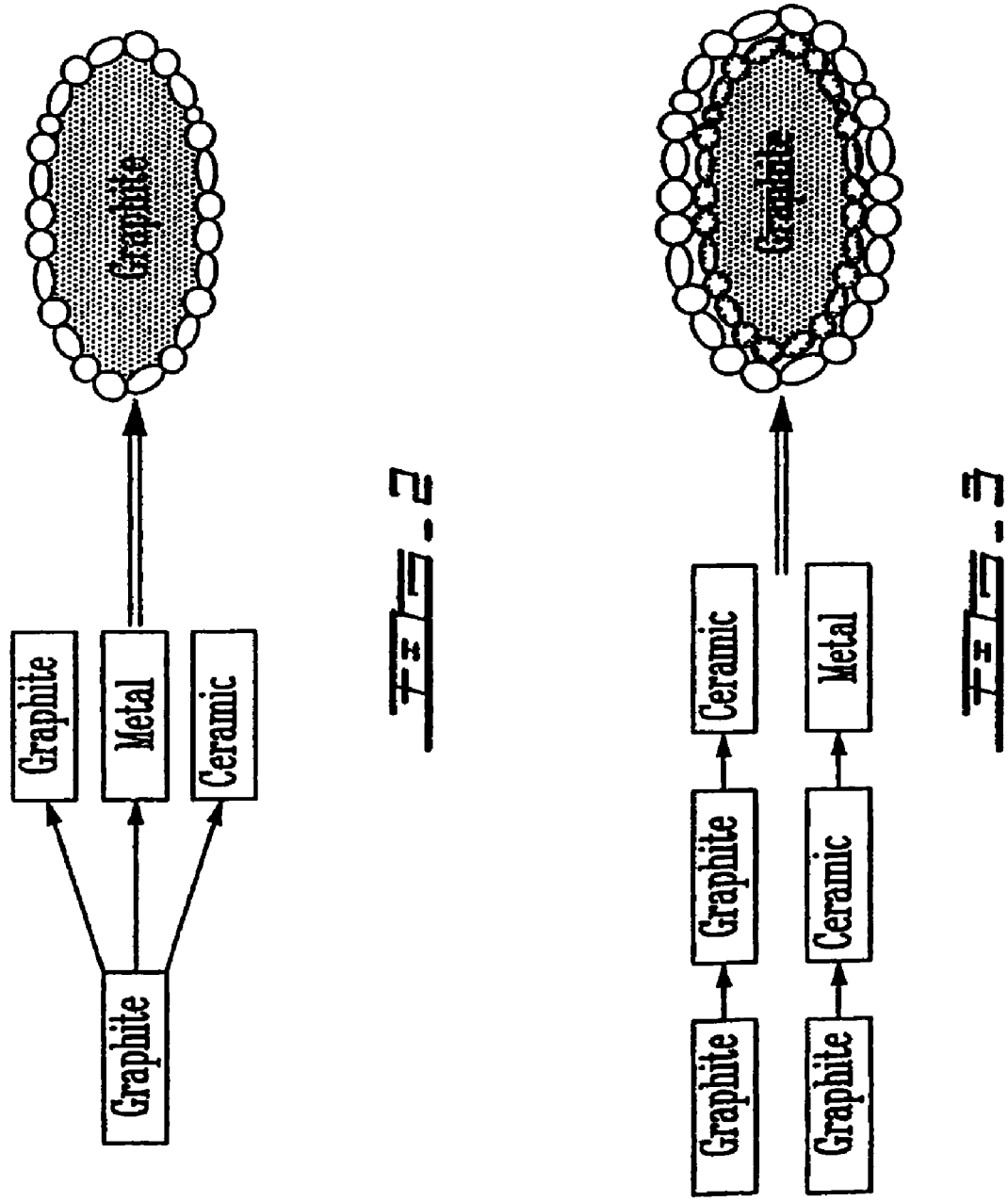

PARTICLE CONTAINING A GRAPHITE BASED NUCLEUS WITH AT LEAST ONE CONTINUOUS OR DISCONTINUOUS LAYER, PROCESSES FOR PREPARING THE SAME AND THEIR USES

FIELD OF THE INVENTION

The present invention relates to new particles made of a graphite based conductive nucleus. The nucleus of these particles is at least partially coated with a second material. The outer surface of the nucleus is entirely or partly coated with the second material, which is of a kind and/or physical shape that is different from that of the nucleus.

The present invention also relates to processes allowing to prepare homogenous mixtures of coated particles of the invention, by crushing together particles intended to constitute the nucleus with particles of an interactive functional agent. The particles of the interactive functional agent are larger than the particles that constitute the nucleus of coated particles of the invention.

The present invention also relates to the uses of this new type of particles that possesses particularly interesting electrochemical and mechanical properties, for example as a material that constitutes electrodes for electrochemical generators and as an additive for paints.

STATE OF THE ART

Japanese Patent bearing number P2000-51121 describes a lithium based secondary battery made of an anode whose main component is carbon, and a cathode whose main component is a lithium containing transition metal oxide, and an electrolyte. The material of the cathode of which the cathode previously mentioned is made, contains a carbon modified surface that is coated with a $Li_4Ti_5O_{12}$ based spinelle structure. This material has an activity voltage higher than 1.2 volts, and at this voltage, it has limited passivation. This cathode material is obtained by mixing a lithium hydroxide and a titanium oxide with carbon in a colloidal solution. After drying and solidification, the mixture is treated at a temperature in the range between 400° and 1000° Celsius in a non oxidizing atmosphere.

U.S. Pat. No. 5,521,026 describes the preparation of polymer dispersions including large quantities of solid non conductive particles, by crushing the particles together in the presence of a non polar solvent. Spreading films intended for batteries and obtained from these polymer dispersions are more uniform and have lesser porosity.

The processes known to this day for the preparation of coated particles have for example the following disadvantages:
 use of important quantities of toxic solvents;
 bringing the process into operation is very long;
 very high costs for example in the case of processes using plasma deposition technologies;
 lack of versatility with respect to the diversity of coated particles that can be prepared by bringing a single process into operation;
 problems of agglomeration and very high particle size dispersion with respect to particles that are prepared; and
 a limitation with respect to the thickness of the coating that can be deposited on the nucleus.

The coated particles known to this day have for example the disadvantage of showing an on uniform porosity that is detrimental to the power of batteries that include such materials.

A need therefore existed for a new process allowing the preparation of coated particles and which is free of at least one of the disadvantages of the processes of the prior art.

A need also existed for mixtures of new coated particles having at least one of the following properties:
 homogenous distribution;
 absence of small particles (fines);
 good electrochemical capacity;
 good security when incorporating them into batteries; and
 good mechanical stability of the coating.

Method A schematically illustrates the coating of small size graphite (B) on a large size graphite (A) of prismatic shape.

Method B schematically illustrates the coating of the same graphite with ceramic.

Method C schematically illustrates the coating of the same graphite with metal particles.

FIG. 2: this figure is a schematic representation of the principle of coating graphite with different types of materials: graphite, ceramic and metal.

FIG. 3: this figure is a schematic representation of coating graphite with a multilayer of materials such as, a metal, a ceramic or a graphite as well as coating with layers consisting of mixtures of these materials.

Figure 1:
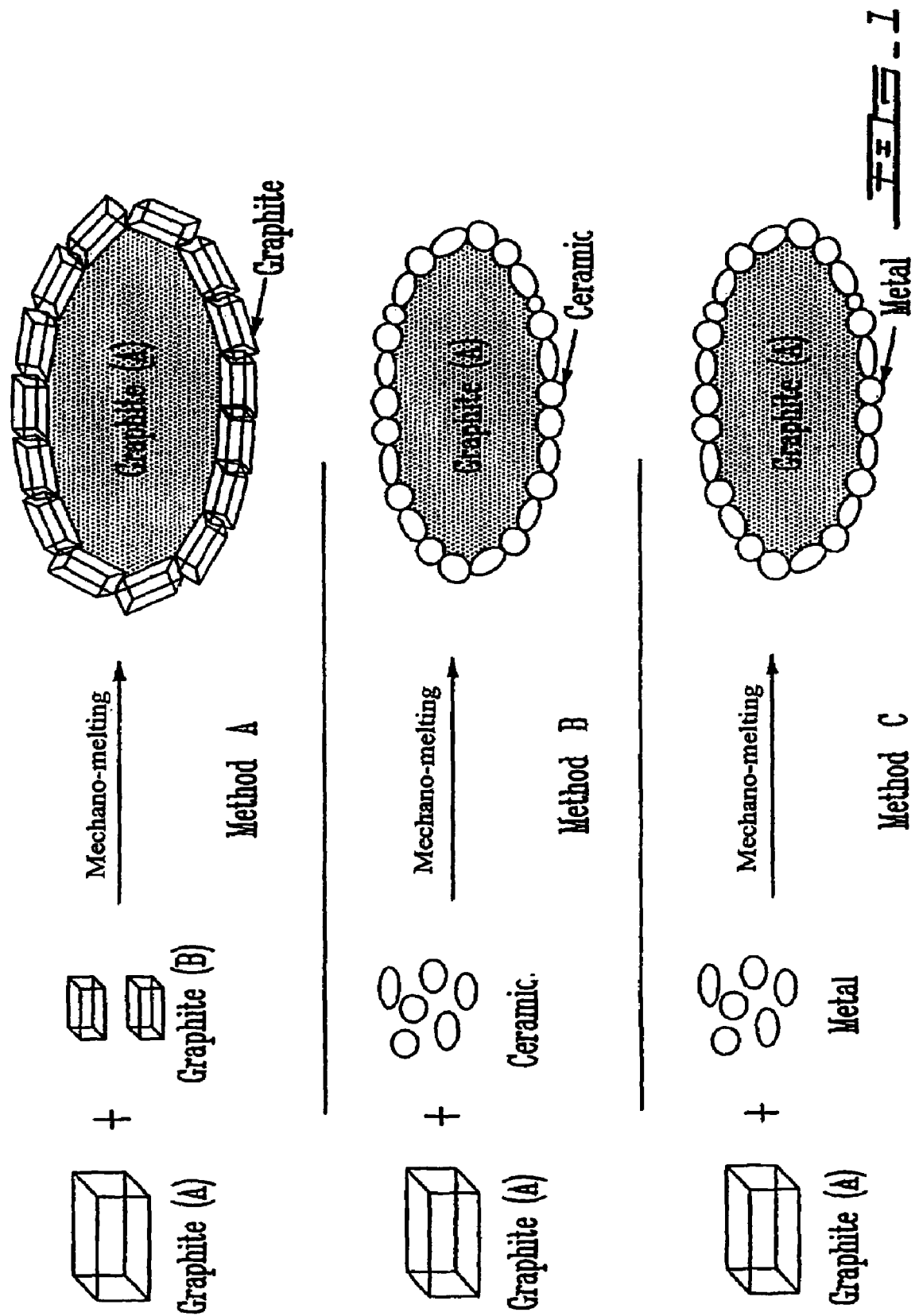
FIG. 1: this figure schematically illustrates 3 distinct modes of operation of a process according to the present invention that allow a particle of graphite to be coated with different materials and by the mechano-melting method.
Figure 4:
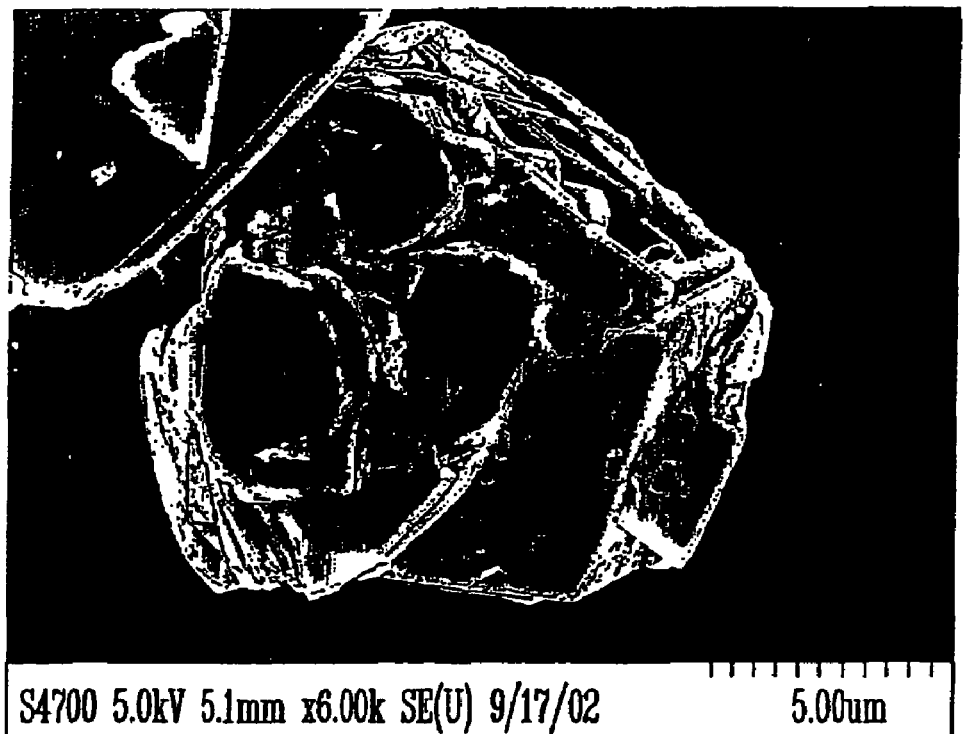
Figure 5:
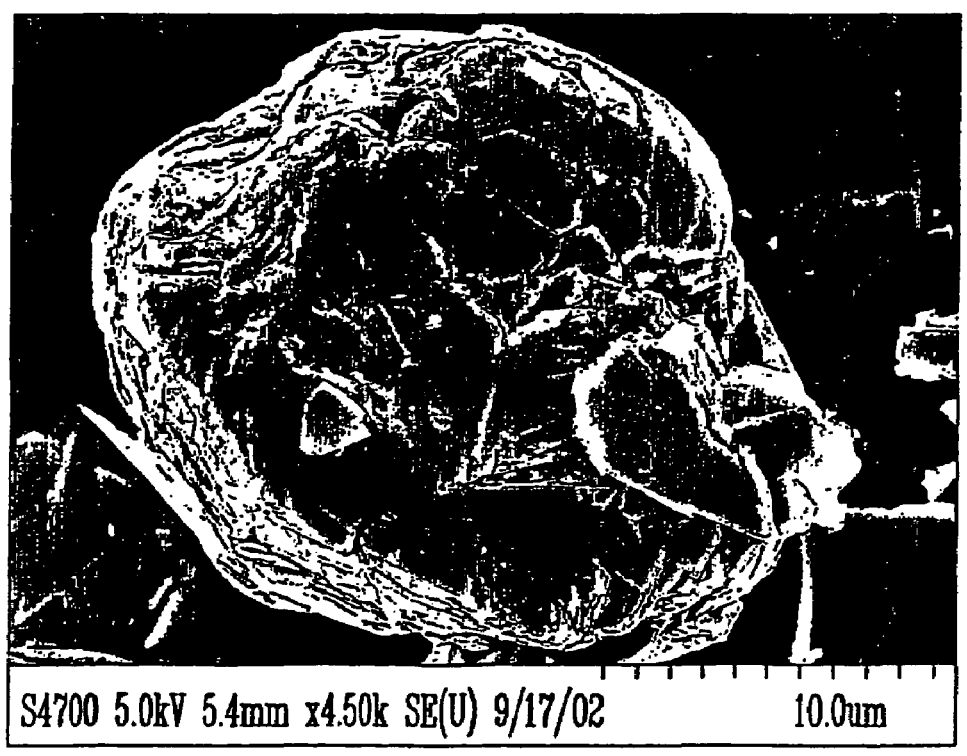

FIGS. 4 and 5: these figures are pictures made with a scanning electron microscope (SEM) and showing the coating of a 20 micrometer graphite, with a graphite of a size that is respectively between 3 and 5 micrometers by using the mechano-melting method.

Figure 6A:
Figure 6B:

FIGS. 6A and 6B are SEM pictures of particles coated according to the invention as obtained in example A.

Figure 7A:
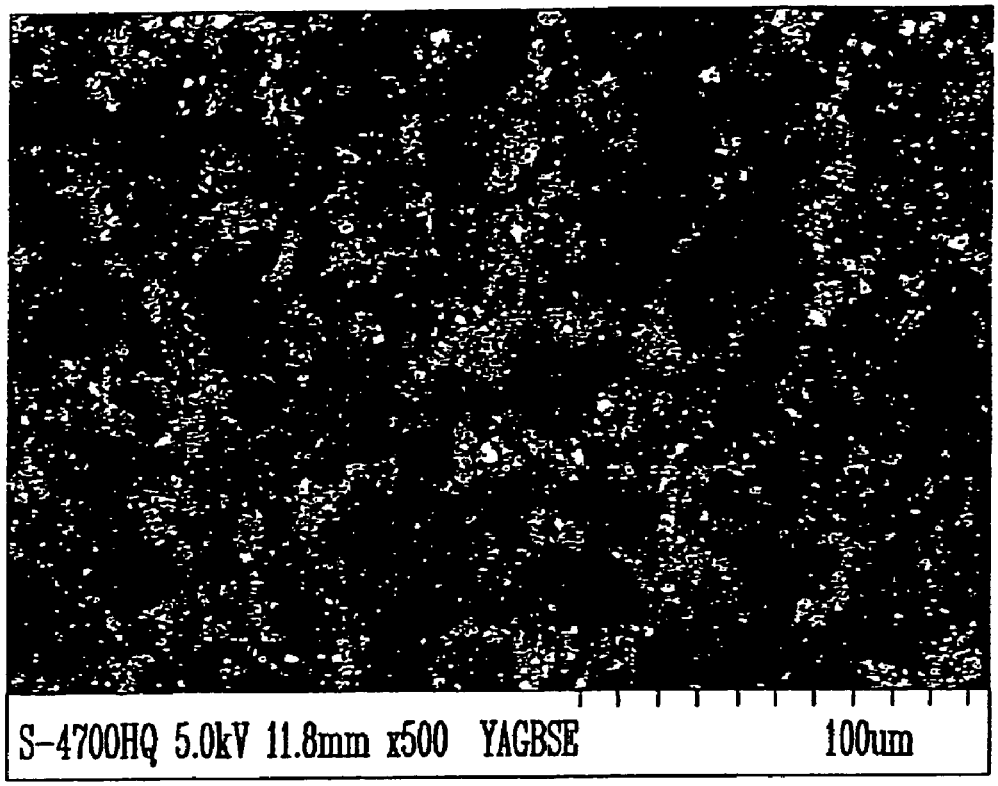
Figure 7B:
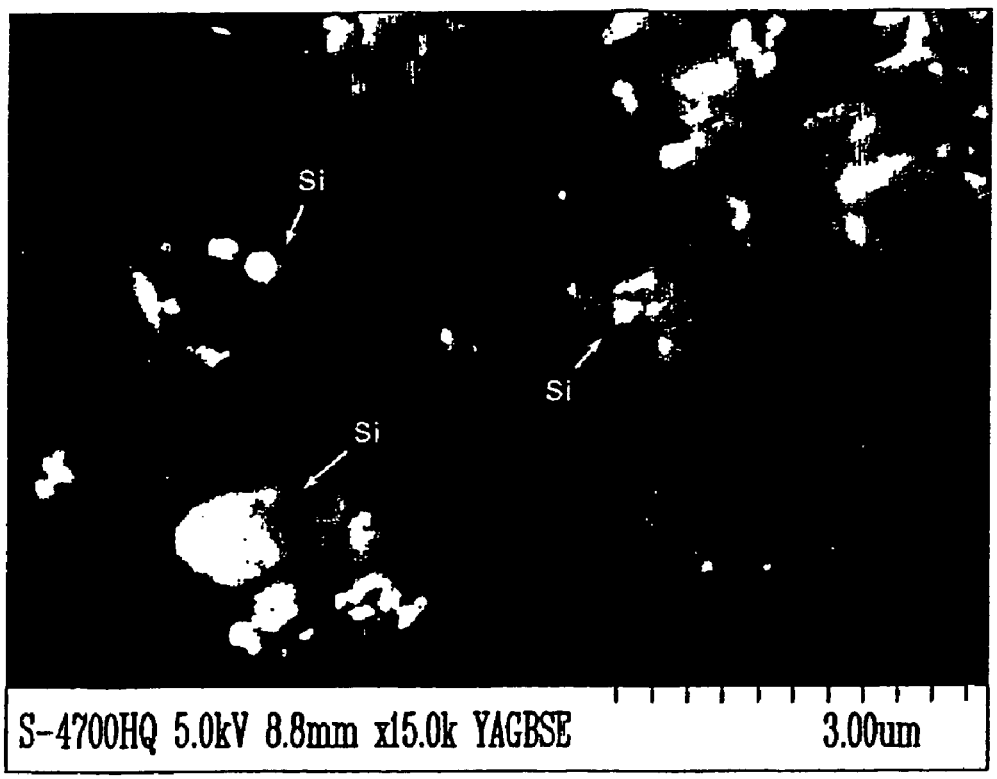

FIGS. 7A and 7B are SEM pictures of particles coated according to the invention as obtained in example C.

Figure 8A:
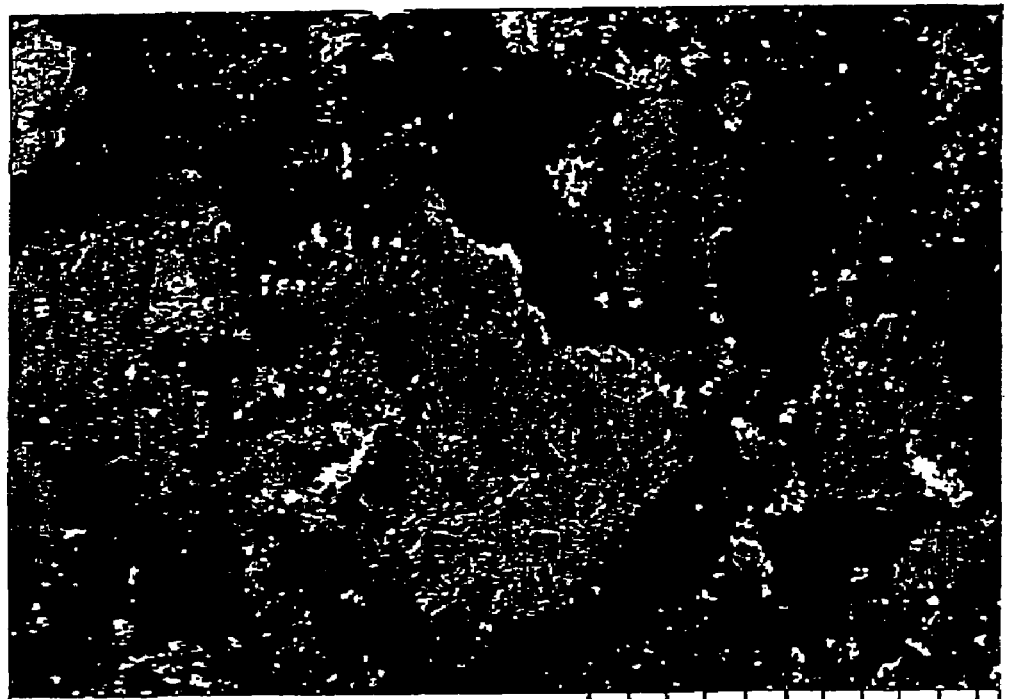
Figure 8B:
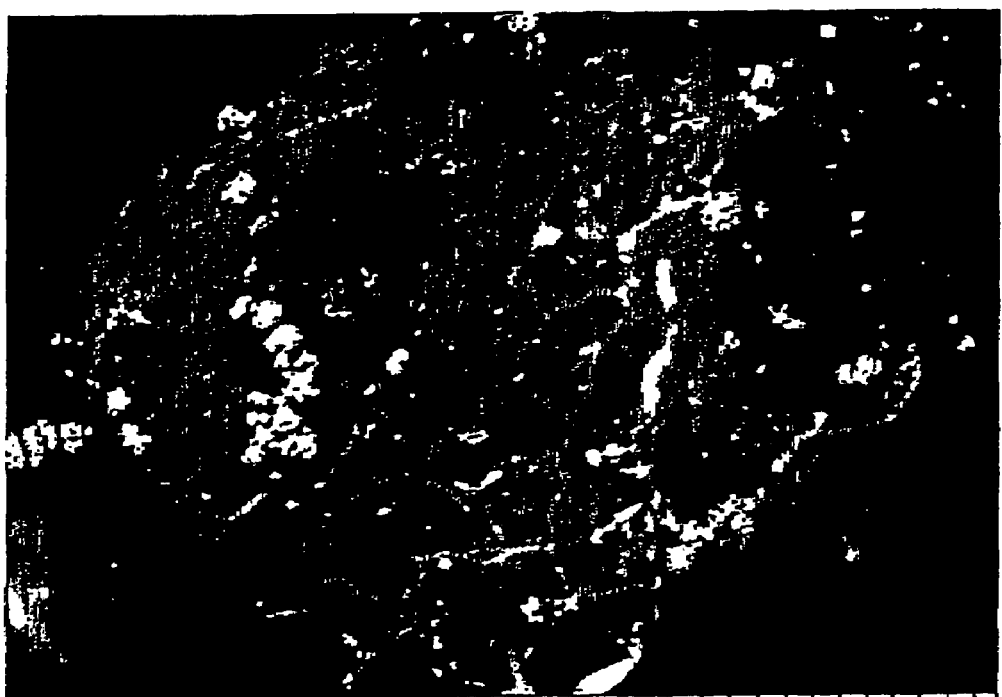

FIGS. 8A and 8B are SEM pictures of coated particles obtained in example F.

Figure 9A:
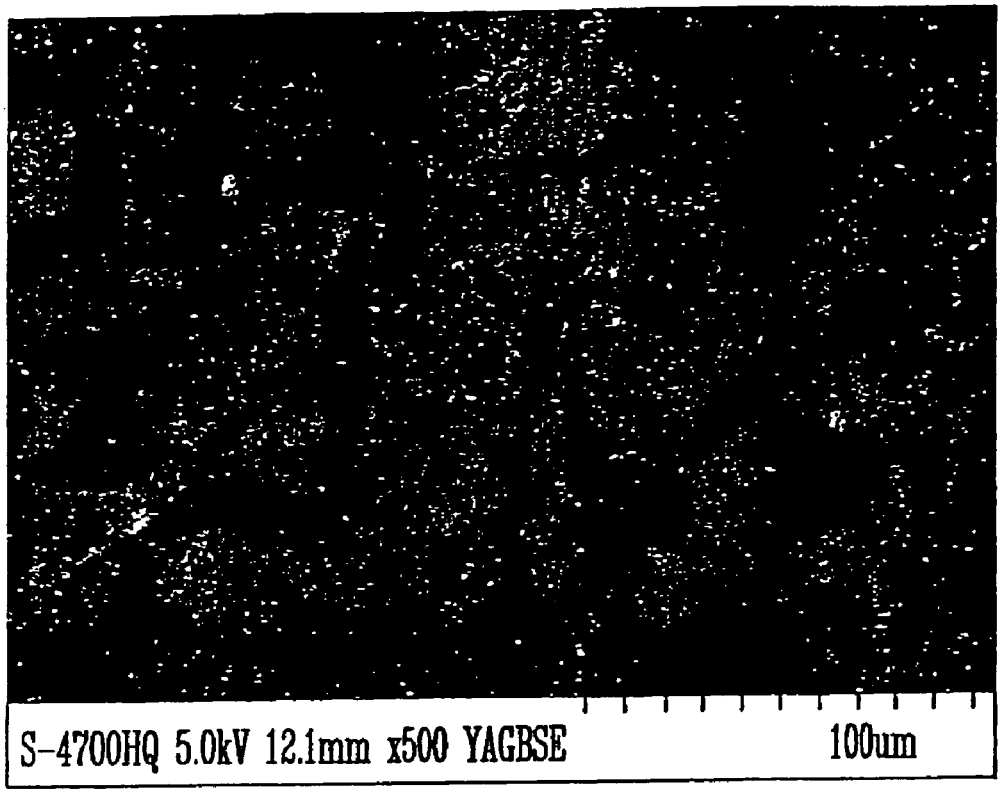
Figure 9B:
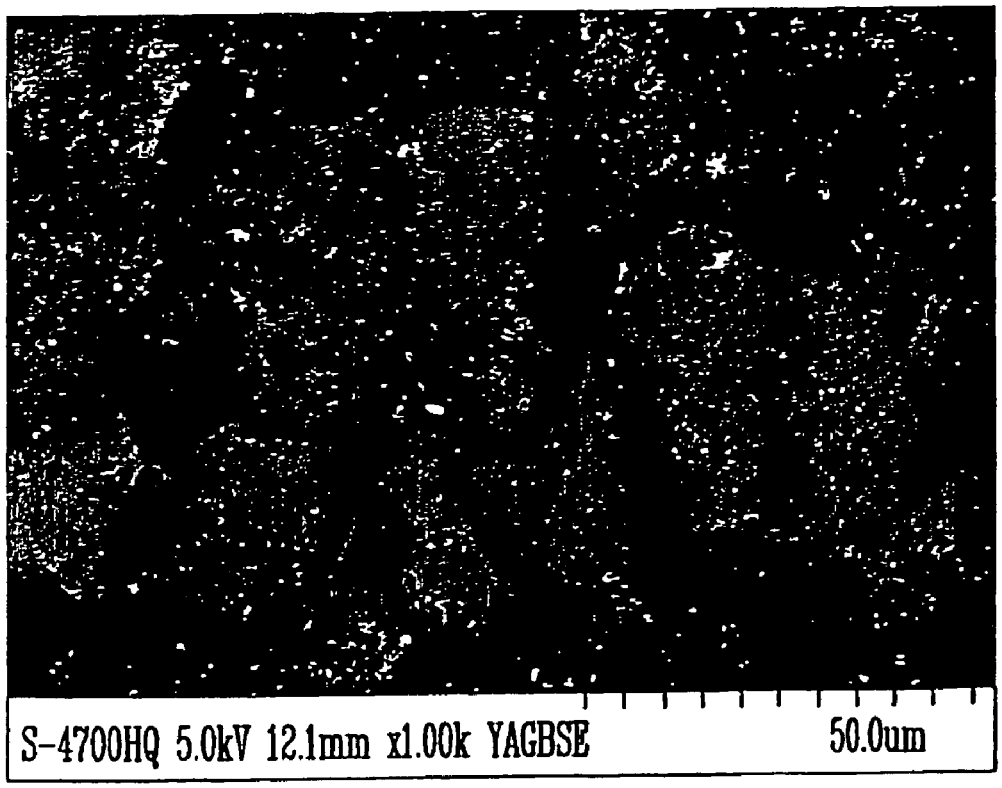

FIGS. 9A and 9B are SEM pictures of coated particles obtained in example G.

SUMMARY OF THE INVENTION

The present invention relates to a process which allows the production of particles consisting of a conductive nucleus including at least one graphite that is at least partly coated on its surface by crushing these particles together with smaller particles of an interactive functional agent having a predetermined particle size and which is of a kind and/or a shape that is different from that of the nucleus of the coated particle.

The particles thus obtained show particularly interesting electrochemical properties and are advantageously used for example as insulating or conductive material for the electrodes of an electrical generator.

GENERAL DEFINITION OF THE INVENTION

A first object of the present invention consists of a process allowing the preparation of a homogenous mixture of particles containing a graphite based conductive nucleus whose surface is at least partly coated, preferably at least 10%, more preferably at least 80% coated, with a coating based on a material that is different in composition or in physical shape from the material that constitutes the nucleus.

Advantageously, the homogenous mixture of coated particles obtained is characterized by a particle size distribution with one single peak, preferably obtained when a particle size determination is made with the Microtrac X100 apparatus of MICROTRAC and/or with a conversion rate $\geq 90\%$.

The process includes at least on step of crushing together the particles intended to constitute the nucleus of the coated particles, so-called nucleus-particles and whose average size is X, with particles of at least one interactive functional agent having an average size Y that is smaller than size X.

Advantageously, the nucleus-particles, as well as the coating-particles that are used show a small particle size dispersion that is preferably [−50%, +50%], i.e. the corresponding mixtures of particles X and particles Y do not contain particles whose size is not more than 50% larger nor smaller than 50% than size X, or size Y.

Within the framework of the present invention, the expression nucleus-particle including at least one graphite is concerned with the particles that constitute the nucleus of the coated particles of the invention and they are made of at least one graphite. These particles advantageously vary in particle size from 1 to 50 micrometers, and preferably the particle size is of the order of 20 micrometers.

Graphite that is present in the nucleus of the coated particles is indifferently a natural or synthetic graphite or a mixture of at least two thereof.

Within the framework of the present invention the expression interactive functional agent relates to an organic or inorganic material or a mixture thereof. This material ensures a double function that translates into a chemical transformation and a physical transformation of the elements that it contains. Thus, the surface of the nucleus is modified following coating with a layer of a selected material and formation of chemical bonds at the level of the surface of the nucleus. There is therefore a transformation of the interactive functional agent into a shape that is bound to the structure of the nucleus, and also a transformation inside the structure for example in the case of siloxanes that are converted into silica following heating and loss of oxygen.

Within the framework oft he present invention, the expression average size of the particles corresponds to the mid-height value at 50% (d50) of the distribution peak.

A graphite whose shape differs from that of the nucleus but falling into the same class of crystallinity, either high, i.e. for a $d_{002}$ lower or equal to 340, or low, i.e. with $d_{002}$ higher than 340, may also be used as interactive functional agent. By way of example, when the nucleus-particles are spherical or prismatic or a mixture thereof, then the coating-particles may for example be fibrous, C60 or C70.

Ceramics may also be used as interactive functional agent. Ceramics of the type $TiO_2$, $Al_2O_3$, $ZrO_2$, SiC, $Si_3N_4$ are preferably used. Those of the type $TiO_2$, and/or $ZrO_2$ and more particularly those having a particle size between 10 and 500 nanometers represent a particularly interesting variant.

Fluorine salts such as LiF or alkali-earth fluorides such as $(LiF)CaF_2$ may also be used.

Metals and alloys may also be used. Among the alloys, those of the metallic type and more particularly metallic alloys containing one of the elements of the group consisting of Si, Sn, Ag and Al are of particular interest.

The following may also be used as interactive functional agents: oxides, preferably oxides of the type MgO, $Li_2CO_3$ and $SiO_2$, and silicon oxides which have been shown to be particularly interesting.

The interactive functional agent may be selected from the group consisting of polymers that are in solid state at room temperature.

The following are preferred:
  four branch polymers preferably having hybrid terminals, more preferably those having acrylate (preferably methacrylate) and alkoxy hybrid terminals (preferably alkoxy having 1 to 8 carbon atoms, more preferably methoxy or ethoxy), or vinyl; at least one branch (and preferably at least two branches) of said four branch polymers being capable of giving rise to cross-linking;
  polyoxypropylenes and polyoxyethylenes having a molecular weight that advantageously varies from 150 to 20,000; and
  polysiloxanes ([Si(R)-0]-) such as those of the type poly (dimethyl)siloxane, poly(ethoxysiloxane), poly(octamethyl)trisiloxane, preferably having a molecular weight that varies from 150 to 10,000, more preferably polyoxysiloxanes of the type poly(dimethylsiloxane-co-methylphenylsiloxane) preferably having a molecular weight of about 800; and
  mixtures of at least two of the above. Four branch polymers are defined more in detail in PCT Application WO/0363287 incorporated by reference.

Mixtures of interactive functional agents may also be used to carry out the process of the invention. Thus, by way of examples, the following two mixtures consisting of:
  60% Poly(dimethylsiloxane) and 40% of $TiO_2$, and
  54% Poly(dimethylsiloxane), 36% of $TiO_2$ and 10% $Li_2CO_3$.

Size X of the particles that constitute the nucleus and size Y of the particles used to constitute the coating of the nucleus are in accordance with the relationship Y/X<1. Preferably X is higher than Y by at least 150% and preferably by at least 200%. This characteristic plays an important role with respect to the uniformity of the mixtures of coated particles obtained.

According to an advantageous embodiment of the invention, the particles of size X and/or those of size Y that are used, have a physical shape of the cylindrical, prismatic and/or blade type.

The step of crushing the materials together is preferably carried out under an inert atmosphere so as to decrease the risks of evaporation of carbon because of the formation of $CO_2$.

The inert atmosphere that is used preferably consists of one or more inert gases. Preferably, there atmosphere used is one that consists of a gas selected from the group consisting of argon and nitrogen and mixtures of these gases, more preferably in the presence of substantially pure argon.

The crushing step of the process of the invention is advantageously carried out at a temperature between 20 and 1000° C., and preferably at a temperature between 25 and 800° C.

The crushing step advantageously lasts between 10 seconds and 4 hours. Preferably it lasts between 60 seconds and 3 hours.

The crushing step of the process of the invention may be carried out under dry condition or in the presence of water or an organic solvent. This solvent is advantageously selected from the group consisting of ketones, alkenes, alkanes, alcohols and mixtures of at least two of the above solvents.

Preferably, water, acetone, toluene, heptane, methanol or a mixture of at least two of the above solvents will be used.

Because of it non polluting character, water is the preferred solvent.

The residual solvent is preferably removed by extraction or evaporation at the end of the crushing step. Solvent removal is preferably carried out up to 90%.

The solvent is advantageously added before initiating the crushing step. For example, a mixture of coating-particles and solvent is prepared, and once the mixture is homogenized, nucleus-particles are added.

The quantity of solvent used represents between 1 and 10% of the weight of the coating-particles that are subject to crushing. Preferably, between 2 and 5% of solvent is used.

According to another particularly advantageous embodiment of the process of the invention, the sizes of the particles are selected so that the ratio Y/X varies between 0.17 and 0.6, preferably said ratio varies between 0.25 and 0.35.

The techniques used for crushing the particles together comprise the methods normally used in the technique under consideration. Thus, when crushing is carried out mechanically, the techniques used include for example, HEBM, jet air-milling, mechano-melting such as the one of Hosokawa type, hybridization, for example the one carried out by using a NHS-O system that is marketed by NAR—Japan, and/or a combination of these techniques.

According to an advantageous embodiment, crushing together of the particles is carried out by mechano-melting at a rotation speed of the device between 2000 and 3000 rotations/minute, preferably said rotation speed is between 2300 and 2700 rotations/minute. According to this embodiment, crushing advantageously lasts between 10 and 210 minutes, more preferably the duration is between 15 and 60 minutes.

According to another advantageous embodiment of the invention, the particles obtained from the mixture are ellipsoidal.

Advantageously, the tap density of the particles obtained by the process of the invention is at least twice higher than that of the initial mixture of the particles of size X and those of size Y that are used to start up said process. Preferably, the tap density of the final product is >0.9 g/cc, more preferably the tap density is $\geq 1$ g/cc.

The process of the invention is advantageously implemented with particles of size X that have a specific surface area, measured with a scanning electronic microscope, that varies between 1 and 50 $m^2/g$, still more preferably, the specific surface area is between 2 and 10 $m^2/g$.

The specific surface area (BET) of the particles of size Y varies between 5 and 800 $m^2/g$, preferably it varies between 10 and 500 $m^2/g$, When coating of the nucleus-particles is carried out with ceramic particles of an average size Yc, these particles are preferably selected so that the ratio Yc/X is lower than 1, and preferably so that the ratio is between 0.0008 and 0.007.

Particularly interesting results are obtained with electronically conductive ceramics. Such ceramics are preferably selected from the group consisting of nitrides, such as TiN and GaN.

When an electronically non-conductive ceramic is used, the latter is preferably selected from the group consisting of $Al_2O_3$ and $BaTiO_3$.

When an electronically semi-conductive ceramic is used, the latter is preferably selected from the group consisting of SiC and $BaTiO_3$.

According to a particularly interesting variant of implementation of the process of the invention, ceramic particles having an average particle size Yc such that 10 nm<Yc<1 μm, preferably such that 50 nm<Yc<150 nm, are used as interactive functional agent.

When the particles of average size Y are particles of an alloy (hereinafter called particles of size Ya), they advantageously at least in part consist of Al, Sn, Ag, Si or a mixture of at least two of the latter elements and the ratio Ya/X is such that 0.005>Ya/X>0.2, preferably said ratio verifies the relationship 0.007>Ya/X>0.0008.

A second object of the present invention consists of coated particles capable of being obtained by one of the processes that constitute the first object of the present invention.

These particles include a conductive nucleus, consisting of at least one graphite, that is continuously or discontinuously coated with at least one layer obtained from an interactive functional agent selected from the group consisting of a graphite of a kind and/or a shape that is different from the one constituting the nucleus but of the same crystallinity, ceramics, metals and alloys, for example metallic type alloys as well as mixtures of at least two of these agents.

Among these particles, the ones whose nucleus consists of a graphite with a purity higher than 95% are particularly interesting with respect to their electrochemical properties. To optimize electrochemical properties, when impurities are present in the nucleus, it is indeed important that they do not interfere with the electronic properties of said coated particle.

Thus, according to another particular embodiment of particles, there is achieved a coating that neutralizes the electronic interferences produced by the impurities that are present in the graphite nucleus. Such a protective coating consists of a material that is different from the impurity(ies) that is (are) present in the graphite nucleus and are capable of producing interfering reactions. By way of example of impurities that could be present in the graphite nucleus, those of the type $Al_2O_3$, $SiO_2$, iron oxide or sulfur may be mentioned.

The coated particles of the invention preferably are of a size between 7 and 100 micrometers, preferably the size of the nucleus is between 10 and 30 micrometers and coating of the nucleus is advantageously made of graphite and with an average thickness between 1 and 5 micrometers.

Another particularly interesting sub-family of particles of the invention consists of particles in which the coating of the nucleus consists of a ceramic having an average thickness between 50 and 150 nanometers.

Another particularly interesting sub-family of particles of the invention consists of particles, in which the nucleus is covered with two continuous and/or discontinuous consecutive layers, each layer preferably having respective thicknesses $E_1$ and $E_2$ comprised between 50 nanometers and 5 micrometers, by means of consecutive crushing steps. These double layer particles are prepared by using two consecutive crushing steps. The coated-particles obtained in the first crushing step now act as "nucleus" and the coating-particles used to provide the second coating are of a size that is substantially smaller than the size of the particles that are coated for a first time. The other operating conditions of the second crushing remain substantially similar.

Two consecutive layers may consist of a different material.

By way of example, a sub-family of multi-coat particles, according to the invention, consists of particles whose nucleus is covered with three layers, each of the 3 layers respectively having a thickness $E_1$, $E_2$, $E_3$ preferably between 50 nanometers and 5 micrometers and the thicknesses of the three layers being such that their sum is preferably smaller than 10 micrometers. In these three layer particles, each of the 3 layers may consist of a different material. It should be noted that the same approach is applicable for the preparation of these 3 coat particles as in the case of the 2 coat particles, except that it includes an additional step of crushing the double coat nucleus-particle together with coating-particles of a size substantially smaller than the size of the double coat particles. The other operating conditions for the third crushing remain substantially the same.

The multiple coating-particles thus prepared have particularly interesting electrochemical and mechanical properties, for example with respect to the electrochemical capacity and the operating safety of batteries including them, and this, thanks to the absence of important exothermic factors.

Particles comprising a graphite core that is covered in the amount of at least 80% of its external surface with said coating, have excellent electronic properties.

The mixtures of particles of the present invention have excellent electrical properties, for example an electronic conductivity that can vary between $10^{-22}$ and $10 \cdot Ohm^{-1} \cdot cm^{-1}$.

In the case of mixtures of particles in which the nucleus consists of graphite and the coating is of the metallic type, an electronic conductivity higher than 300 $Ohm^{-1} \cdot cm^{-1}$ can be measured.

In the case of a mixture of particles in which the coating consists of aluminum, the measured electronic conductivity is higher than 350 $Ohm^{-1} \cdot cm^{-1}$ and in most cases even reaches higher values of about $377 \times 103$ $Ohm^{-1} \cdot cm^{-1}$.

A third object of the present invention resides in the use of coated particles according to the second object of the invention, as insulating or conductive material for electrical generator electrodes.

According to an advantageous embodiment, particles coated with $CeO_2$, $Li_3PO_4$, graphite-Ag, $Li_2CO_3$ and/or MgO-graphite, $Li_2CO_3$—Li are used in fuel cells. In this application, the particles are used for the purpose of storing energy.

A fourth object of the present invention resides in the use of the coated particles of the invention, for example made of polymers-graphites, in coatings, preferably in paints. In this application, the coated particles are used as additives for reinforcing for example the mechanical properties of the paint film formed.

Definition of Preferred Embodiment of the Invention

Crushing fibrous graphite together with spherical graphite is obtained by mixing a graphite of a 20 μm particle size with another graphite having a particle size that varies from 2 to 7 μm. This crushing is obtained by dry mixing or mixing with a solvent while using a high energy ball mill "HEBM" from Spex, by mechano-melting of the Hosokawa type or by "hybridization" of the Nara type. The natural or artificial particle of graphite that originally was prismatic, acquires a new ellipsoidal shape.

$Li_2Ti_2O_3$ is mixed with a graphite of particle size 20 μm. This mixture is obtained by HEBM in a dry or liquid medium or by mechano-melting. The tap density of the mixture and the final particle avec converted into ellipsoidal shape. The mixture of three elements crushed together is carried out from natural 20 μm graphite with a Sn type metallic powder and a ceramic of the type $Li_2Ti_2O_3$. The graphite-metal mixture is crushed with HEBM (dry or in a solvent) or by mechano-melting or by hybridization, and the particle becomes ellipsoidal.

It is thus observed that there is an increase of the tap density of the electrode (generally expressed in grams per $cm^3$), of the kinetics and that there is insertion of lithium in the graphite.

EXAMPLES

The following examples are given purely by way of illustration and should not be interpreted as constituting any limitation of the invention.

Method A: Crushing Graphite Together with Graphite

The core particle of natural graphite has an average size of 20 μm and is prismatic. This graphite is mixed with a spherical graphite of a particle size between 2 and 7 μm. The small size particles of graphite are used for coating the 20 μm particles of graphite. Crushing is obtained by HEBM or by mechano-melting (of the Hosokawa type).

Method B: Crushing Graphite Together with Ceramic.

Crushing is carried out par mixing a 20 μm natural prismatic graphite together with 10% of $Li_2Ti_2O_7$ of a particle size smaller than 1 μm (sub-micron). The natural graphite is coated with the particles of ceramic, and becomes ellipsoidal. This crushing is obtained by HEBM or by mechano-melting (of the Hosokawa type).

The electronic properties of the ceramic do not affect the transformation of the prismatic particle into an ellipsoidal crushed product. The possibility of inserting lithium into the ceramic, that surrounds the graphite, is superposed over the possibility of inserting lithium into the graphite.

Method C: Crushing Graphite Together with a Metal

This method utilizes natural prismatic 20 μm graphite that is mixed together with 20% of a nanometric tin (Sn) powder. This mixture is crushed by mechano-melting of the Hosokawa type. In this way, the prismatic shape of graphite is converted into an ellipsoidal shape. Insertion of lithium into the Sn metal leads to an alloy (LixSny) having a higher possibility as compared to that of inserting lithium into graphite. Formation of the metallic alloy gives rise to a supplement of mass (mAh/g) and volume (mAh/l) capacity at the electrode. There is thus an increase of density of mass (Wh/kg) and volume energy (Wh/l) of the battery.

Example

A Brazilian natural graphite with a particle size of 350 μm (starting material) is reduced to 20 μm by Jet-milling (graphite-A). Graphite B has a particle size that varies from 2 to 10 μm, and is obtained by jet milling the starting graphite. The tap density of graphite A and graphite B is about 0.35 g/cc.

A mixture of 80% graphite A and 20% of graphite B is introduced into a mechano-melting device of the Hosakawa type model AMS-Lab during 30 minutes. The product obtained has a tap density of 0.75 g/cc and an ellipsoidal shape.

It therefore seems that, in the case of insertion into a natural or artificial graphite, the kinetics of lithium is limited by the prismatic shape of the particles of these materials (1). In these materials, the portion of the basal planes $f_b$ is predominant as compared to the edge portion $f_e$. Their tap density is low (0.2-0.3 g/cc) because of the prismatic shape of their particles. Thus, the kinetics and diffusion of lithium in graphite was increased by transformation of the prismatic shape into ellipsoidal. This ellipsoidal shape reduces the portion $f_b$ which appears to represent the limiting barrier for the insertion of lithium into graphite.

This advantageous ellipsoidal shape has thus been obtained by way of illustration by the three methods hereinabove described, and moreover, with a minimum amount of starting materials.

Example A $Li_2CO_3$ Based Coating

A mixture consisting of 500 grams of particles of a graphite type is used as first starting component.

The particles of the mixture have an average size of 20 microns and are prismatic. They are treated with a mechano-melting, device such as those marketed by Hosokawa in Japan, during 15 minutes and at a temperature of 25 degrees Celsius.

Under the effect of this treatment, the surface of the particles of graphite is modified and results in a spherical shape. The mixture thus obtained is designated graphite SNG20.

45 grams of the SNG20 mixture are mixed with 5 grams of $Li_2CO_3$ (μ) and the mixture is treated during 25 seconds with a hybridizer sold by NARA of Japan.

The particles of graphite thus obtained contain a coating including 10% of lithium carbonate ($Li_2CO_3$) and 90% graphite.

Pictures of these particles are shown in FIGS. 6A and 6B.

Example B

Coating of $Li_2CO_3$+LiF 45 grams of the SNG20 mixture are mixed with 2.5 grams of $Li_2CO_3$ and with 2.5 grams of LiF. The thus prepared mixture is treated during 25 seconds with a hybridizer (NARA, Japan).

The particles of graphite obtained are characterized by a hybrid coating comprising $Li_2CO_3$ and LiF.

Example C (Coating of Si): HEBM+MECHANO+Hybridizer

A macroscopic powder consisting of Si particles 2 microns is crushed in a Spex HEBM (High Energy Ball Milling) during 2 hours which gives a nano powder of Si.

A mixture consisting of 45 grams of spherical particles of graphite SNG20 is mixed with 5 grams of Si (μ) and treated during 25 seconds with a hybridizer (NARA, Japan).

The particles of graphite thus obtained contain a coating based on particles of nano-Si, whose size is smaller than 500 nanometers.

The particles obtained are visible on the pictures of FIGS. 7A and 7B.

Example D (Coating of Si): HEBM+MECHANO

A 2 micron macroscopic powder of Si is crushed in a Spex HEBM (High Energy Ball Milling) during 2 hours to give Nano Si.

A mixture of 45 grams of particles of graphite SNG20 is mixed with 5 grams of particles of nano Si, during 15 minutes, by mechano-melting (Hosokawa, Japan).

The particles of graphite thus obtained include a coating based on particles of nano-Si, smaller than 500 nanometers.

Example E (Coating of Si): HEBM+INOMISER+HYBRIDIZER

A macroscopic powder of silicon (Si) particles, average size 2 microns, is crushed in a Spex HEBM (High Energy Ball Milling) during 2 hours and the result is a mixture of particles of silicon.

45 grams of a mixture of particles of graphite SNG20 obtained in example A are mixed with 5 grams of particles of silicon of an average size of 500 nanometers, during 25 seconds, by means of a hybridizer (NARA, Japan).

Example F

Synthesis as a Function of Silicon Oil

A mixture of particles of graphite SNG20 obtained in example A and silicon oil in the weight ratio of (10:20) is produced with HEBM.

The mixture is heated during 4 hours under controlled atmosphere (Argon).

Pictures of the coated particles thus obtained are identified in FIGS. 8A and 8B.

Example G

Synthesis of Particles Coated as a Function of an Alloy of Siloxane Polymer and ERM A mixture consisting of particles of graphite of the type SNG20 and a hybrid 4 branch polymer (PEO-PPO) Siloxane-ERM (1:1), of DKS, in the weight ratio (80:20) is prepared by HEBM.

The mixture is heated during 4 hours under controlled atmosphere (Argon), at a temperature of 500 degrees Celsius.

The particles of graphite thus prepared have 10 to 30% of their surface covered with silicon and amorphous carbon. They are visible on the pictures identified FIGS. 9A and 9B.

Amorphous carbon results from a pyrolysis of the polymer of type ERM. This carbon ensures a double role, the first one being to provide electronic conduction bridges between graphite and the alloy of silicon, once lithium has been inserted into silicon.

In view of the porosity of the carbon thus formed at the surface of the particles, the second function of carbon is to absorb the volume expansion of the alloy.

On the other hand, an improvement of the homogeneity of the mixtures of particles obtained by the process of the invention has been established in the following manner.

There is provided a known mixture of two types of particles, namely particles of type Si or $Li_2CO_3$ of particle size 500 nm (d50) D10, 300 nm and D90, 1 micron, with particles of graphite of particle size 20 microns (d50) D10, 10 microns and D90 28 microns.

The mixture thus obtained in known manner, by simple mixing, has shown during a particle size analysis carried out with the apparatus Micro Trac X100 of Horiba, two relative peaks at concentrations of 0.5 micron and 20 microns.

On the other hand, when carrying out an intimate crushing by mechano-melting or with a Hybridizer according to the process of the invention, the particle size analysis shows a single peak at 20 microns.

These results demonstrate the fact that the particles of graphite are completely coated with particles of the Type Si or $Li_2CO_3$. On the other hand, these experimental results reveal an excellent force of contact between the small particles and the graphite nucleus.

Although the present invention has been described with specific embodiments, it is understood that many variations and modifications may be grafted to said embodiments, and the present invention aims at covering such modifications, uses or adaptations of the present invention following in general, the principles of the invention and including any variation of the present description which will become known or conventional in the field of activity in which the present invention in found, and which may be applied to the essential elements mentioned above, in accordance with the scope of the following claims.

The invention claimed is:

1. Process for preparing a homogenous mixture of coated particles containing a graphite based conductive nucleus and at least two partial or complete coating of the surface of said nucleus, the coating comprising a first interactive functional agent, the first interactive functional agent consisting of a material that differs in composition and/or in physical shape from the material that constitute the nucleus of the coated particles, said process including at least one step of crushing particles of the graphite nucleus together with particles of the first interactive functional agent, the particles of graphite having an average size X and those of the first interactive functional agent having an average size Y such that the ratio Y/X is smaller than 1, and said process further comprising a second crushing step, wherein the coating particles obtained in the first crushing step are subjected to a second crushing in the presence of a second interactive functional agent that is identical or different from the first interactive functional agent used in the first crushing step, the average size of the particles of the second interactive functional agent being smaller than the size of the coated particles obtained in the first crushing step.

2. Process according to claim 1, in which the first and second interactive functional agents are selected from the group consisting of:
graphite having a shape that differs from that of the graphite(s) that constitute(s) the nucleus but belonging to the same class of crystallinity;
ceramics;
fluoride salts or alkaline-earth fluorides;
metals and alloys;
oxides; and
polymers that are solid at room temperature.

3. Process according to claim 1, in which the size of the particles that are subject to crushing is selected so that X is at least 150% higher than Y.

4. Process according to claim 1, in which at least 10% of the surface of the nuclei is covered with a coating.

5. Process according to claim 1, in which the homogenous mixture of coated particles obtained has a size distribution having a single peak when the particle size is measured with the Microtrac X100 apparatus of MICROTRAC and/or by means of a conversion rate $\geq 90\%$.

6. Process according to claim 1, in which the crushing steps are carried out under inert atmosphere.

7. Process according to claim 1, in which the crushing steps are carried out at a temperature between 20 and 1000° C.

8. Process according to claim 1, in which the crushing steps are carried out for a period during 10 seconds to 4 hours.

9. Process according to claim 1, in which the crushing steps are carried out in the presence of a solvent.

10. Process according to claim 9, in which the solvent is water.

11. Process according to claim 9, in which the quantity of solvent represents from 1 to 10% by weight of the total weight of the coating-particles that are present in the mixture of particles subject to crushing.

12. Process according to claim 1, in which the particles of size X and/or those of size Y are cylindrical, prismatic and/or in the form of blades.

13. Process according to claim 1, in which the Y/X ratio is between 0.17 and 0.6.

14. Process according to claim 1, in which the crushing is carried out mechanically.

15. Process according to claim 14, wherein the crushing is carried out by mechano-melting at a rotation speed of the installation between 2000 and 3000 rotations/minute.

16. Process according to claim 15, implemented for a period between 10 and 210 minutes.

17. Process according to claim 1, in which the particles of the mixture obtained are ellipsoidal.

18. Process according to claim 1, in which the tap density of the mixture of particles obtained is at least twice higher than that of the particles of size X that are used when starting said process.

19. Process according to claim 18, in which the tap density of the final product is >0.9 g/cc.

20. Process according to claim 1, in which the specific surface area (BET) of the particles of size X varies between 1 and 50 m$^2$/g.

21. Process according to claim 1, in which the specific surface area (BET) of graphite Y varies between 5 and 800 m$^2$/g.

22. Process according to claim 1, in which the particles of average size Y are ceramic particles hereinafter designated particles of size $Y_c$.

23. Process according to claim 22, in which the $Y_c/X$ is between 0.0008 and 0.007.

24. Process according to claim 22, in which the ceramic is electronically conductive.

25. Process according to claim 22, in which the ceramic is electronically non-conductive.

26. Process according to claim 22, in which the ceramic is electronically semi-conductive.

27. Process according to claim 22, in which the particles of ceramic have an average size $Y_c$ such that 10 nm<$Y_c$<1 µm.

28. Process according to claim 1, in which the particles of average size Y are particles of an alloy, hereinafter designated particles of size $Y_a$, comprising Al, Sn, Ag, Si or a mixture of at least two thereof.

29. Process according to claim 28, in which ratio $Y_a/X$ is such that 0.005>$Y_a/X$>0.2.

30. Process according to claim 1, in which the coated particles that are prepared include a graphite based conductive nucleus and at least three partial or complete coatings of said nucleus, said process further comprising third crushing step, wherein the coated particles obtained in the second step of crushing are subject to a third crushing in the presence of a third interactive functional agent that is identical to or different from the first and second interactive functional agents used in the first two crushing steps, the average size of the particles of the third interactive functional agent being smaller than that of the coated particles obtained in the second crushing step.

31. Coated particle obtained by the process according to claim 1, wherein said particle contains a nucleus that comprises graphite, said particle being partially or completely coated with at least two layers of a material comprising at least two interactive functional agents selected from the group consisting of graphite, ceramics, metals and alloys as well as mixtures of at least two thereof, and wherein each of the layers has respective thicknesses $E_1$ and $E_2$ comprised between 50 nanometers and 5 micrometers.

32. Particle according to claim 31, comprising a graphite nucleus with a purity higher than 95%.

33. Particle according to claim 32, in which impurities that are present in the nucleus do not interfere with the electronic properties of said particle.

34. Particle according to claim 33, in which the coating of the nucleus neutralizes electronic interferences generated by the impurities that are present in the graphite nucleus.

35. Particle according to claim 31, in which the size of the nucleus is between 7 and 100 micrometers.

36. Particle according to claim 31, in which the coating of the nucleus comprises graphite and has an average thickness between 1 and 5 micrometers.

37. Process according to claim 31, in which the coating of the nucleus comprises a ceramic and has an average thickness between 50 and 150 nanometers.

38. Particle according to claim 31, in which each of the two layers consists of a different material.

39. Particle according to claim 31, in which the nucleus is covered with three layers, each of the three layers respectively having a thickness $E_1, E_2, E_3$ each thickness being between 50 nanometers and 5 micrometers and the thicknesses of the three layers being such that their sum is lower than 10 micrometers.

40. Particle according to claim 39, in which each of the three layers consists of a different material.

41. Particle according to claim 31, comprising a graphite core wherein at least 80% of its external surface is covered with said coating.

42. Mixture of particles as obtained by implementation of the process defined in claim 1 and having at least one of the following properties:

an electronic conductivity between $10^{-22}$ and $10^3$ $Ohm^{-1} \cdot cm^1$; and a particle size distribution preferably restricted between −50%, +50%.

43. Mixture of particles according to claim 42, in which the nucleus comprises graphite, the coating is of metallic type and the electronic conductivity is higher than 300 $Ohm^{-1} \cdot cm^{-1}$.

44. Mixture of particles according to claim 43, in which the coating comprises aluminum and the electronic conductivity is higher than 350 $Ohm^{-1} \cdot cm^{-1}$.

45. An electrode of an electrical generator, wherein the electrode comprises an insulating material or a conductor, wherein the insulating material or conductor comprise the mixture of particles according to claim 44.

46. A fuel cell, wherein the fuel cell comprises a mixture of particles according to claim 42, coated with $CeO_2$, $Li_3PO_4$, graphite-Ag and/or MgO-graphite.

* * * * *

UNITED STATES PATENT AND TRADEMARK OFFICE
CERTIFICATE OF CORRECTION

PATENT NO. : 7,588,826 B2 Page 1 of 1
APPLICATION NO. : 10/532793
DATED : September 15, 2009
INVENTOR(S) : Zaghib et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 890 days.

Signed and Sealed this

Twenty-first Day of September, 2010

David J. Kappos
*Director of the United States Patent and Trademark Office*